United States Patent
Samaras et al.

(10) Patent No.: US 9,630,729 B2
(45) Date of Patent: Apr. 25, 2017

(54) TIMING SCREW CUTOFF SYSTEM

(71) Applicants: Christopher J. Samaras, Tinley Park, IL (US); Christopher J. Ludwig, Buffalo Grove, IL (US)

(72) Inventors: Christopher J. Samaras, Tinley Park, IL (US); Christopher J. Ludwig, Buffalo Grove, IL (US)

(73) Assignee: Illinois Tool Works Inc., Glenview, IL (US)

(*) Notice: Subject to any disclaimer, the term of this patent is extended or adjusted under 35 U.S.C. 154(b) by 473 days.

(21) Appl. No.: 13/673,121

(22) Filed: Nov. 9, 2012

(65) Prior Publication Data

US 2013/0186041 A1 Jul. 25, 2013

Related U.S. Application Data

(60) Provisional application No. 61/589,034, filed on Jan. 20, 2012.

(51) Int. Cl.
| | |
|---|---|
| *B65B 13/00* | (2006.01) |
| *B65B 13/02* | (2006.01) |
| *B65B 13/18* | (2006.01) |
| *B65B 17/02* | (2006.01) |
| *B65B 61/12* | (2006.01) |
| *B65G 33/06* | (2006.01) |

(52) U.S. Cl.
CPC ............ *B65B 13/00* (2013.01); *B65B 13/02* (2013.01); *B65B 13/18* (2013.01); *B65B 17/025* (2013.01); *B65B 61/12* (2013.01); *B65G 33/06* (2013.01); *Y10T 225/393* (2015.04)

(58) Field of Classification Search
CPC ......... B65B 13/00; B65B 13/02; B65B 13/18; B65B 61/12; B65B 17/025; B65G 33/06
See application file for complete search history.

(56) References Cited

U.S. PATENT DOCUMENTS

| | | | | |
|---|---|---|---|---|
| 3,383,828 A | * | 5/1968 | Cunningham | ................... 53/398 |
| 4,025,023 A | * | 5/1977 | Moffitt | .......................... 225/100 |
| 4,526,128 A | * | 7/1985 | Sorace et al. | ................. 198/625 |
| 5,182,894 A | * | 2/1993 | Bate | ....................... B65B 11/008 |
| | | | | 53/170 |
| 5,359,830 A | * | 11/1994 | Olson | ................... B65B 17/025 |
| | | | | 53/134.1 |
| 5,737,898 A | * | 4/1998 | Grimm | ................... B65B 21/04 |
| | | | | 53/147 |

(Continued)

FOREIGN PATENT DOCUMENTS

| | | | |
|---|---|---|---|
| DE | 4216671 A1 * | 9/1993 | ........... B65B 21/183 |
| DE | 20 2010 008827 | 12/2010 | |
| JP | 3 032886 | 1/1997 | |

*Primary Examiner* — Hemant M Desai
*Assistant Examiner* — Chinyere Rushing-Tucker
(74) *Attorney, Agent, or Firm* — Pauley Erickson & Kottis

(57) ABSTRACT

A system for packaging containers within a flexible container carrier includes a generally continuous string of container carriers arranged with divisible weakened connections between adjacent individual container carriers that is fed through an applicating machine for applying the container carriers to individual containers. A cut-off device is arranged downstream of the applicating machine to selectively accelerate or decelerate the containers to separate the generally continuous string into individual container carriers.

13 Claims, 5 Drawing Sheets

(56) References Cited

U.S. PATENT DOCUMENTS

| | | | |
|---|---|---|---|
| 6,189,675 B1* | 2/2001 | Nosch | B65C 9/04 |
| | | | 198/394 |
| 2002/0005027 A1* | 1/2002 | Lohrey et al. | 53/413 |
| 2005/0269188 A1* | 12/2005 | Hartness et al. | 198/697 |
| 2006/0010835 A1* | 1/2006 | Shaw et al. | 53/403 |
| 2009/0094938 A1* | 4/2009 | Biernat et al. | 53/48.4 |
| 2010/0018167 A1* | 1/2010 | McCutcheon et al. | 53/478 |
| 2010/0044185 A1* | 2/2010 | Hahn | B65G 47/5113 |
| | | | 198/459.2 |
| 2010/0192525 A1 | 8/2010 | Lam et al. | |
| 2011/0259767 A1 | 10/2011 | Olsen | |

* cited by examiner

TIMING SCREW CUTOFF SYSTEM

CROSS REFERENCE TO RELATED APPLICATION

This application claims the benefit of U.S. Provisional Patent Application Ser. No. 61/589,034, filed 20 Jan. 2012. The Provisional Application is hereby incorporated by reference herein in its entirety and is made a part hereof, including but not limited to those portions which specifically appear hereinafter.

BACKGROUND OF THE INVENTION

Field of the Invention

This invention relates to a package separation device that pulls consecutive packages apart by accelerating the leading package away from the trailing causing weakened connections to separate and break.

Description of Prior Art

Container carriers are used to unitize a plurality of containers. Typical containers are bottles, cans and other containers having a sidewall and a neck, chime or raised rib around an upper portion of the container. Container carriers typically connect two or more containers into a sturdy unitized package of containers. Container carriers are generally planar arrays of rings, sometimes referred to as "six-pack carriers," and may be formed from a thermoplastic sheet material.

The thermoplastic sheet material is typically extruded and then punched so that large numbers of container carriers are formed end to end resulting in continuous elongated strings or strips of container carriers. Unless specified otherwise, container carriers as used in this specification are defined as the continuous elongated string of container carriers prior to application onto containers and subsequent division into individual container carriers. Weakened connections are typically formed in the continuous strips of container carriers between each adjacent container carrier. Previous iterations of Hi-Cone machinery utilized sharp blades actuated into the container flow or fixed dull blade mounted on an angle to separate packages. Both of these options proved to be impractical for large containers and/or plastic containers. Sharp blades have been ruled out due to the risk of nicking the sidewall of the container and causing leaks, and the angled blade became geometrically impossible for large containers due to the application depths required.

The present invention includes a system wherein adjacent packages are pulled apart rather than cutting or breaking the weakened connections between such packages. To accomplish this, a set of timing screws are preferably used to accelerate a leading package away from a trailing package to create enough tension in the carrier web to separate the perforations or other weakened connection and, accordingly, the packages. This method in conjunction with the "fan foldable" perforation will create a reliable package separator without any of the aforementioned issues.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
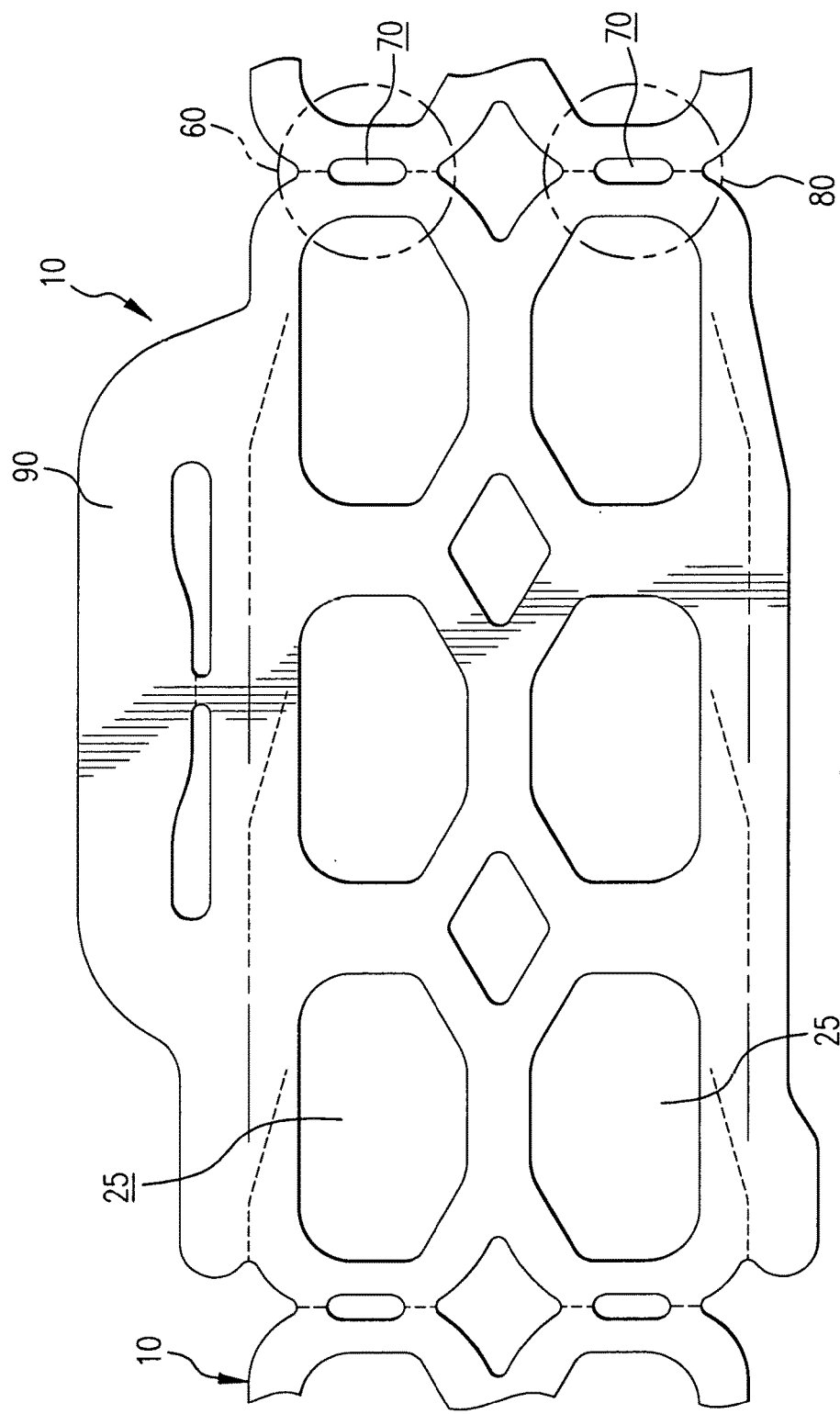
FIG. 1 is a side elevational view of a string of container carriers according to one preferred embodiment of this invention.

FIG. 1 shows container carrier 10 as the term is used in the claimed invention. Container carriers 10 are preferably arranged in a generally continuous elongated string or strip having divisible weakened connections 80 between adjacent individual container carriers. According to a preferred embodiment of this invention, container carriers 10 comprise a single layer of material.

As shown in FIG. 1, weakened connections 80 may comprise perforations 60, apertures 70 and/or a combination thereof. Desirably, weakened connections 80 are separable through the force of the timing screws described herein but not by the force of the application of container carrier 10 to containers as described below.

According to a preferred embodiment of this invention, such as shown in FIG. 1, container carriers 10 include a plurality of container receiving apertures 25 for engaging a plurality of containers to form a multipackage. Container carriers 10 preferably include a flexible web forming a plurality of container receiving apertures 25 arranged in longitudinal rows and transverse ranks. As shown in FIG. 1, two longitudinal rows of three transverse ranks form a single container carrier 10 within a string of generally continuous container carriers 10.

Figure 2:
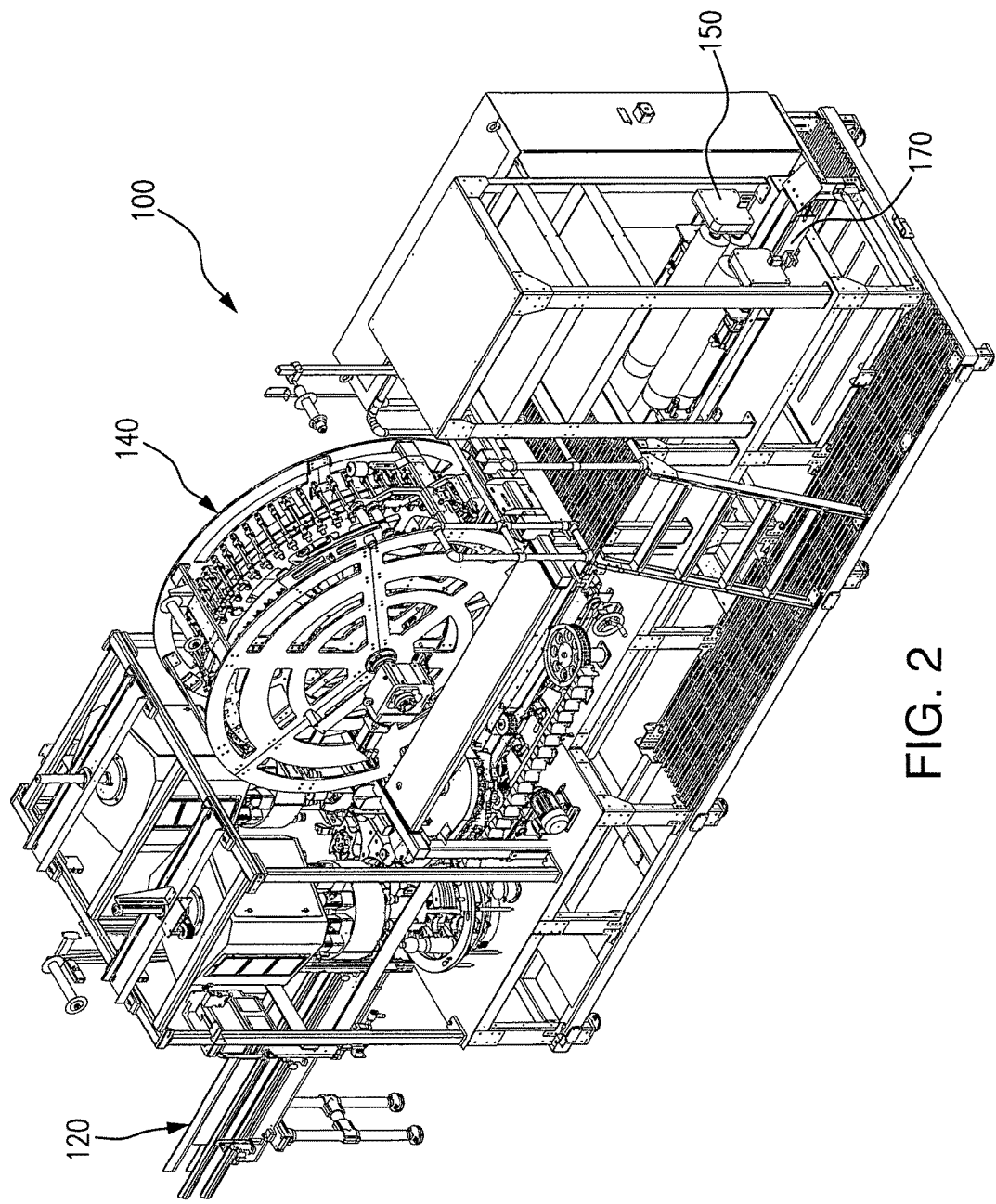
FIG. 2 is side perspective view of a packaging system according to one preferred embodiment of ibis invention.

FIG. 2 shows a packaging system including an applicating machine 100 and a cutoff device 150 for packaging multiple containers in a carrier according to one preferred embodiment of this invention. A continuous string of carriers 10 moves through machine 100, specifically through jaw dram 140, where it is applied to containers and then separated into individual unitized packages with cutoff device 150.

Carriers 10 preferably travel through machine 100 from an unwinder that disperses a continuous string of carrier stock from either reels or large boxes of carrier stock and ultimately to packages where each carrier is separated into a unitized package, each package containing a plurality of uniform containers. A typical configuration for a package is a "six-pack" containing two longitudinal rows of containers its three transverse ranks. Additional desired packages such as four-packs, eight packs and twelve packs may be unitized using machine 100 according to this invention, and such additional sizes of packages are limited only by the consumer market for such additional sizes.

According to a preferred embodiment of this invention, the subject system is used in connection with a generally continuous string of fan folded container carriers, such as those described in U.S. Ser. No. 13/092,347, which is hereby incorporated by reference. Each container carrier in the generally continuous string is preferably separated from adjacent container carriers by one or more apertures 70 and/or perforations 60. The cutoff device 150 described herein make separation of such adjacent container carriers possible without the use of additional mechanical aids such as knives.

Infeed conveyor 120 may extend generally through applicating machine 100 to provide a generally continuous supply of containers to applicating machine 100 and specifically jaw drum 140. Infeed conveyor 120 is preferably positioned to convey containers longitudinally into a platform of applicating machine 100, in preferably two longitudinal rows.

According to one preferred embodiment of this invention, applicating machine 100 for packaging multiple containers includes moving a generally continuous supply of container carriers 10 through the machine 100 and onto jaw drum 140. Jaw drum 140 stretches individual container receiving apertures 25 into engagement with containers to create unitized multipackages of containers. However, immediately after such engagement, each successive package is attached to the previous package along the weakened connection 80 described above and proceeds along an outfeed conveyor 170. Following application to containers, the continuous string of container carriers 10 applied to containers are divided into individual carriers and thus individual multipackages using cut-off device 150 resulting in individually unitized packages of a desired size which are then dispersed to a case packer (not shown), for example, by using a turner/diverter.

Figure 3:
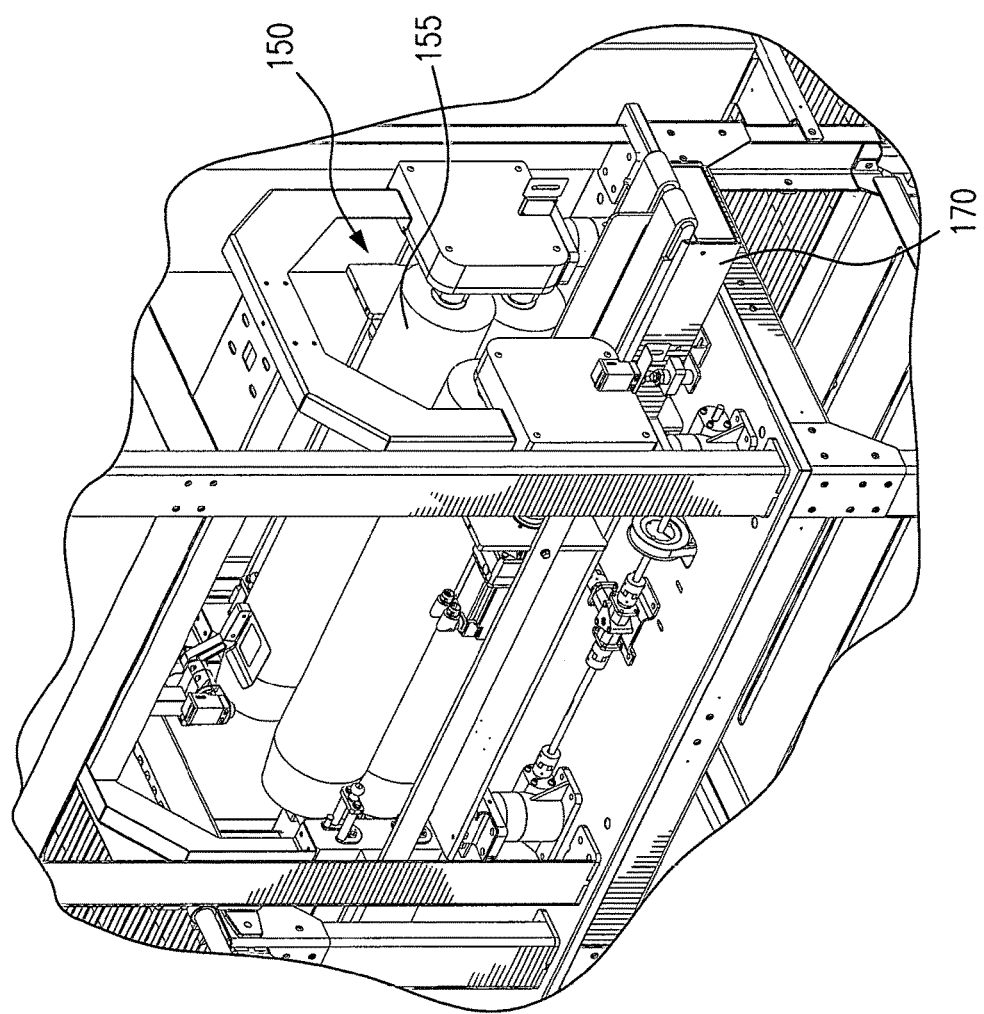
FIG. 3 is a side perspective view of a timing screw cutoff system from the packaging system shown in FIG. 2.

The cut-off device 150, such as shown in FIG. 3, preferably comprises two sets of timing screws 155, each set preferably positioned on each side of the outfeed conveyor 170. Timing screws 155 preferably engage each leading multipackage of the adjacent multipackages existing from the jaw drum 140. Next, as the trailing multipackage enters the timing screw 155, the leading multipackage is accelerated away from the trailing multipackage through the timing screws 155 thereby creating a breaking force to separate the weakened connections 80 between each adjacent container carrier 10. Likewise, the trailing multipackage may be decelerated away from the leading multipackage to affect the breaking force necessary to separate adjacent container carriers 10. The timing screws 155 shown in FIG. 3 are representational and, as such, are shown schematically as cylinders, however, timing screws 155 as contemplated in the present invention will include a thread to permit the desired movement of multipackages through the timing screws 155.

Figure 4:
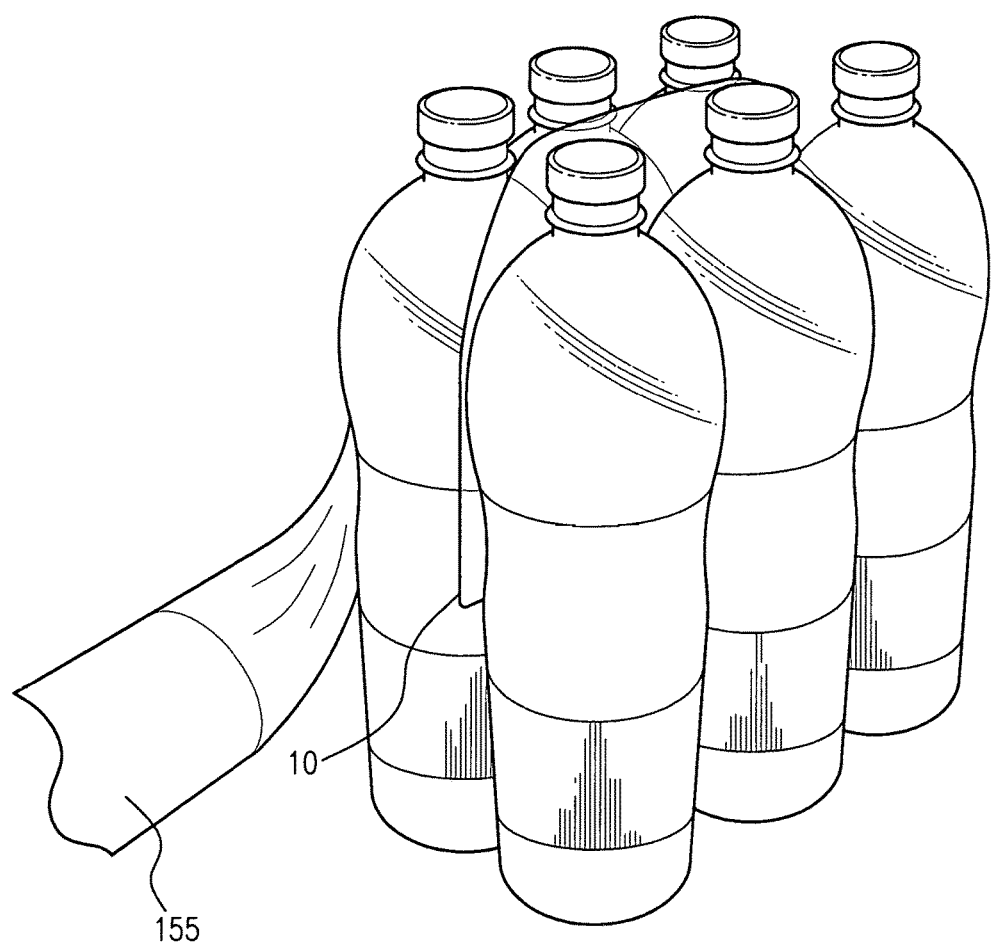
FIG. 4 is a side view of a timing screw according to one preferred embodiment of this invention.
Figure 5:
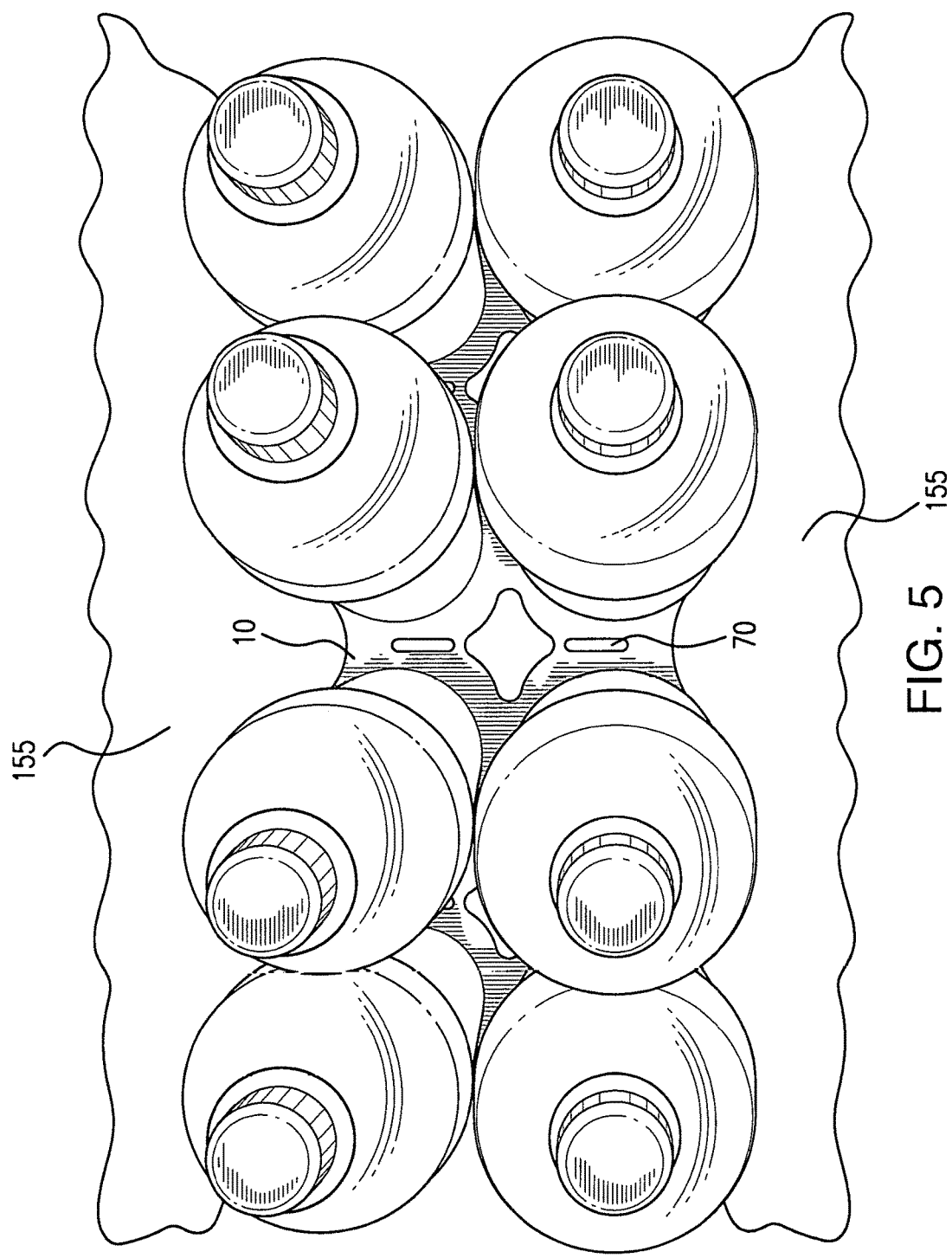
FIG. 5 is a top view of a pair of timing screws separating container carriers according to one preferred embodiment of this invention.

One specific contemplated design of timing screws 155 is shown in FIG. 4 and FIG. 5. Timing screws 155 are preferably formed of a durable, corrosion resistant material such as plastic and more specifically such as ultra-high molecular weight polyethylene (UHMW) or urethane. As shown in FIG. 4, timing screws 155 preferably further include a generally coarse twisting thread that changes in form as it extends across the timing screw 155. Specifically, according to one preferred embodiment of this invention, timing screws 155 include a thread that starts out relatively fine to maintain a slow movement of the multipackage and then transitions to a coarser thread to accelerate the movement of the multipackage toward a middle area of timing screw 155 and then transitions back toward a finer thread to once again slow the multipackage as it exits the cut-off device 150.

According to one preferred embodiment of this invention, timing screws 155 may be sized and tuned to create a space between each adjacent multipackage following separation, such as shown in FIG. 5. In addition, one or both of the infeed conveyor 120 and the outfeed conveyor 170 may be overtraveled to permit a faster travel of the multipackage while not engaged with the timing screws 155. The speed of each of the conveyors and the timing screws may be servo driven and set to a desired speed, for instance, a speed of an orienter device positioned at an upstream side of the applicating machine 100.

While in the foregoing specification this invention has been described in relation to certain preferred embodiments thereof, and many details have been set forth for purposes of illustration, it will be apparent to those skilled in the art that the apparatus is susceptible to additional embodiments and that certain of the details described herein can be varied considerably without departing from the basic principles of the invention.

What is claimed is:

1. A system for packaging containers within a flexible container carrier comprising:
    a generally continuous string of container carriers arranged with divisible weakened connections between adjacent individual container carriers;
    an applicating machine for applying the container carriers to individual containers to form a generally continuous string of container carriers applied to containers; and
    an adjacent pair of timing screws arranged downstream of the applicating machine to engage a group of containers and selectively accelerate or decelerate the containers to separate the generally continuous string applied to containers into unitized packages comprising individual container carriers each applied to a plurality of containers while leading and trailing packages remain within the pair of parallel timing screws to positively engage the groups of containers and remain engaged while leading and trailing multipackages are within the timing screws.

2. The system of claim 1 wherein the timing screw includes a relatively coarse thread that engages with the containers.

3. The system of claim 2 wherein the timing screw includes a thread that starts out relatively fine to maintain a slow movement of the containers and then transitions to a coarser thread to accelerate the movement of the containers toward a middle area of the timing screw and then transitions back toward a liner thread.

4. The system of claim 1 further comprising an outfeed conveyor, wherein the outfeed conveyor is operable at varying speeds.

5. A system for packaging containers within a flexible container carrier comprising:
    a generally continuous string of container carriers arranged with divisible weakened connections between adjacent individual container carriers;
    an applicating machine fir applying the container carriers to individual containers to harm a generally continuous string of container carriers applied to containers; and
    a pair of parallel timing screws arranged downstream of the applicating machine to selectively engage a group of containers and accelerate the containers to separate the generally continuous string applied to containers into unitized packages comprising individual container carriers each applied to a plurality of containers while leading and trailing packages are within the pair of parallel timing screws to positively engage the groups of containers and remain engaged while leading and trailing multipackages are within the timing screws.

6. The system of claim 5 wherein an individual container carrier having a plurality of containers therein is positioned within a thread of each of the timing screws.

7. The system of claim 5 wherein each timing screw comprises a thread that starts out relatively fine to maintain a slow movement of the containers and then transitions to a coarser thread to accelerate the movement of the containers toward a middle area of the timing screw and then transitions back toward to finer thread.

8. The system of claim 5 wherein the applicating machine comprises a jaw drum for rotationally moving and stretching the generally continuous string of container carriers.

9. A cut-off device for separating adjacent a generally continuous string of container carriers applied to individual containers with an applicating machine, the cut-off device comprising:
   a timing screw arranged downstream of the applicating machine to selectively accelerate or decelerate the containers to separate the generally continuous string applied to individual containers into unitized packages comprising individual container carriers applied to individual containers.

10. The cut-off device of claim 9 further comprising a pair of timing screws arranged parallel relative to each other.

11. The cut-off device of claim 9 wherein the timing screw includes an external thread sized to accommodate and transport two or more containers.

12. The cut-off device of claim 11 wherein the external thread varies across a length of the timing screw.

13. The cut-off device of claim 11 wherein the timing screw is operated at a generally constant speed and the acceleration or deceleration occurs through a variation of the thread.

\* \* \* \* \*